United States Patent
Merello et al.

(10) Patent No.: US 6,363,214 B1
(45) Date of Patent: Mar. 26, 2002

(54) SYSTEM FOR CONTROLLING THE MOTION OF AN ARM CARRYING A READ/WRITE HEAD DURING LOAD AND UNLOAD OPERATIONS

(75) Inventors: Andrea Merello, Arese; Gianluca Ventura, Cinisello Balsamo; Roberto Peritore, Trezzano Sul Naviglio, all of (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 0 days.

(21) Appl. No.: 09/661,754

(22) Filed: Sep. 14, 2000

(30) Foreign Application Priority Data

Sep. 16, 1999 (IT) ......................................... VA99A0025

(51) Int. Cl.$^7$ ................................................. H02P 3/00
(52) U.S. Cl. ..................... 388/928.1; 318/109; 318/138; 318/139; 318/161; 318/254; 318/432; 318/459; 318/500; 360/60; 360/69; 360/75
(58) Field of Search ................................ 318/109, 139, 318/161, 254, 459, 500; 360/60, 75, 69, 78.09; 369/44.28, 44.25, 44.29, 44.34, 124.01, 124.15

(56) References Cited

U.S. PATENT DOCUMENTS

| | | | |
|---|---|---|---|
| 5,091,680 A | * 2/1992 | Palm | 318/368 |
| 5,408,374 A | * 4/1995 | Morehouse et al. | 360/105 |
| 5,442,266 A | * 8/1995 | Morehouse et al. | 318/272 |
| 5,486,957 A | * 1/1996 | Albrecht | 360/75 |
| 5,504,402 A | * 4/1996 | Menegoli | 318/377 |
| 5,615,064 A | * 3/1997 | Blank et al. | 360/75 |
| 5,675,450 A | * 10/1997 | Kadlec | 360/78.09 |
| 5,768,045 A | * 6/1998 | Patton, III et al. | 360/78.04 |
| 5,781,363 A | * 7/1998 | Rowan et al. | 360/78.09 |
| 5,889,629 A | * 3/1999 | Patton et al. | 360/75 |
| 6,081,112 A | * 6/2000 | Carabolante et al. | 324/177 |
| 6,239,935 B1 | * 5/2001 | Shrinkle | 360/75 |
| 6,282,046 B1 | * 8/2001 | Houston et al. | 360/73.03 |

* cited by examiner

Primary Examiner—Robert E. Nappi
Assistant Examiner—Tyrone Smith
(74) Attorney, Agent, or Firm—Lisa K. Jorgenson; Allen, Dyer, Doppelt, Milbrath & Gilchrist, P.A.

(57) ABSTRACT

A method for controlling an electromagnetic actuator having an arm connected thereto uses a circuit that temporarily places in a high impedance state output nodes connected to a winding of the electromagnetic actuator. A detected BEMF is compared with a lower threshold and an upper threshold. Current in the electromagnetic actuator is monitored and controlled. A current pulse is provided to the electromagnetic actuator based upon the comparison of the detected BEMF with the lower and upper thresholds. The respective amplitudes of successively provided current pulses having a same polarity are progressively increased, and an amplitude of a provided current pulse having a polarity opposite a polarity of a preceding current pulse is decreased. The amplitude of the driving current pulses provided to the winding of the electromagnetic actuator advantageously adapts automatically to varying frictional conditions, or to any other cause of variation of the mechanical load of the actuator. These conditions occur when the arm moved by the electromagnetic actuator starts to slide up or flies off the parking ramp.

25 Claims, 5 Drawing Sheets

SYSTEM FOR CONTROLLING THE MOTION OF AN ARM CARRYING A READ/WRITE HEAD DURING LOAD AND UNLOAD OPERATIONS

FIELD OF THE INVENTION

The present invention relates to electronic circuits for controlling and driving electromagnetic actuators and, more particularly, to a single winding actuator commonly known as a voice coil motor (VCM).

BACKGROUND OF THE INVENTION

Voice coil motors are used in many applications and, in particular, in hard disk drive (HDD) systems to position the read/write head over the tracks of the rotating disk, or on a suitably provided parking ramp. In recent HDD systems, the parking of the head is automatically commanded if the system is not correctly supplied, and when the controller commands it. A significant difference from older drives is in the arrangement of a parking ramp in correspondence to the most external part of the disk.

Commonly, the main function of the circuitry for parking the head on the ramp is to command the rotation swing of the arm of the VCM toward or away from the parking ramp. For such a function, it is generally necessary to generate a signal having an amplitude almost proportional to the instantaneous angular speed of the VCM. This information must be obtained from the motor itself.

The back electromotive force BEMF is proportional to the speed according to the following relation:

$$BEMF = K_E \cdot \omega = \frac{K_E}{armlength} \cdot speed$$

The variable $K_E$ is the proportionality coefficient between the angular velocity and the BEMF. Angular speed detection is commonly carried out according to a first approach (discontinuous mode) in which the output bridge stage driving the winding of the VCM is set to a high impedance condition (tristate), and after the current flowing in the winding has decayed to zero. The voltage on the nodes of the winding is read, thus providing a direct indication of the BEMF. A second approach (continuous mode) detects the BEMF by processing the voltage detected between the two output nodes of the bridge stage, and the current flowing in the winding of the motor.

In systems operating in a discontinuous mode, it is possible to implement the ramp loading and unloading operations of a head by using a logic circuit to drive the VCM moving the arm, and to carry out the ramp loading and unloading operations.

Known techniques of delivering current pulses only as a function of the speed of the arm during the parking operations on a ramp, and during the release and positioning of the head, do not account for the abrupt increase and decrease of the friction when the arm starts or ends its motion on the parking ramp.

This can cause the motor to be fed with current pulses of insufficient magnitude to generate a torque sufficient to overcome the abruptly increased friction force, or to be fed with current pulses of excessive magnitude. This causes an excessive ripple during a subsequent control of the speed of the arm over the tracks of the disk.

Another drawback of known systems is the overdriving of the VCM moving the head carrying arm when the arm reaches a commonly present mechanical stop at the top of the parking ramp. Such an overdriving interval is necessary to ensure the reaching of the parking position under all the contemplated conditions. This is in addition to the evident inefficiency, and the repeated mechanical stresses due to repeated rebounds of the arm against the mechanical stop.

SUMMARY OF THE INVENTION

The present invention provides a system and method for the above described inconveniences and drawbacks. According to a first aspect of the invention, a control procedure for an electromagnetic actuator controlling a swingable arm carrying a read write head that implements an adaptive control of the magnitude of the current pulses delivered to the winding of the electromagnetic actuator is provided. This is done by establishing a progressive increment of the amplitude of successively delivered current pulses of the same polarity if the detected BEMF remains in an unchanged relationship with pre-established lower and upper thresholds after each current pulse is delivered to the winding.

The amplitude of the driving current pulses provided to the winding of the electromagnetic actuator advantageously adapts automatically to varying frictional conditions or to any other cause of variation of the mechanical load of the actuator. These conditions occur when the arm moved by the motor starts to slide up or flies off the parking ramp.

At least three different situations can be identified according to the present invention in which the intensity of current pulses is usefully adapted. A first situation is at the arm release. At the issuing of the command for releasing the head, the arm moved by the VCM is parked on the ramp. Static friction and eventually even the parking landing geometry onto which the arm comes to rest causes the motor to overcome a relatively high initial resisting torque. In this situation, the system of the invention suitably delivers current pulses of relatively large amplitude. When the arm starts moving and its speed becomes close to the target range, the friction becomes more dynamic and is relatively lower than at the start. Therefore, the amplitude of the current pulses is progressively reduced.

A second situation is while regulating the speed. Speed regulation starts when the speed reaches a value within a target range or window. Both during unloading and loading, and while the arm is flying over the disk tracks or climbing the ramp, the torque required from the VCM is relatively small to avoid the generation of an excessive ripple.

A third situation is while braking. The most effective braking of the motion of a VCM includes saturating the driving bridge in the direction opposite to the direction of driving. Normally the control logic commands the braking when the actual speed exceeds a certain value. The system of the invention increases the effectiveness of the braking action by adaptively modifying the amplitude of the braking current pulses.

Essentially, the control procedure is for driving an electromagnetic actuator (VCM) for moving an arm carrying a read/write head through a circuit adapted to temporarily place in a high impedance state the output nodes to which the winding of the actuator is connected. This is done by comparing the detected BEMF with a pre-established lower threshold ($B_{TH-}$) and upper threshold ($B_{TH-}$), and a circuit for controlling and detecting the driving current.

The control procedure comprises delivering to the VCM a first current pulse of a certain polarity or of an opposite polarity depending on whether the BEMF is respectively smaller or greater than the pre-established lower and upper thresholds, respectively. The amplitude of successively delivered current pulses of the same polarity are progressively increased. According to a preferred embodiment of the invention, the incremental increasing of the amplitude of pulses of the same polarity successive to a first pulse is effected by comparing the driving current with a maximum threshold value (In+, In−) that is adaptively increased starting from a base value. This is done as long as the detected BEMF remains in the same position referred to the pre-established lower and upper thresholds after each pulse.

For a hardware embodiment of the invention, the reading of the BEMF during the time interval between successive driving pulses and the monitoring of the current flowing through the winding of the electromagnetic actuator may be implemented by the addition of a window comparator. The comparator compares the detected current with a positive threshold and with a negative threshold. This is in case of driving in the opposite direction, whose value is incrementally and adaptively adjusted by the control logic that generates commands of direction and for placing the output half-bridges in a high impedance (tristate) state.

According to a further aspect of this invention, a procedure for verifying the reaching of the stop by the arm at the top end of the parking ramp may be optionally implemented to optimize the driving. This is done by interrupting the operation after a repeated detection of a null speed for a certain time interval. In this way, the overdriving of the VCM once the reaching of the mechanical stop is acknowledged, can be advantageously minimized without causing repeated mechanical stresses or acoustic noise, and with a reduced energy consumption.

Basically this optional routine periodically detects the BEMF, and resets a counter at every non-null detection, and increments the counter at each detection of a null value of the BEMF consecutive to a non-null detection and to any other null detection successive to the first one. Stopping the VCM is performed when a desired value is reached.

BRIEF DESCRIPTION OF THE DRAWINGS

The different aspects and advantages of the invention will become even clearer through the following description of several embodiments of the invention and by referring to the attached drawings, wherein.

DETAILED DESCRIPTION OF THE PREFERRED EMBODIMENTS

Figure 1:
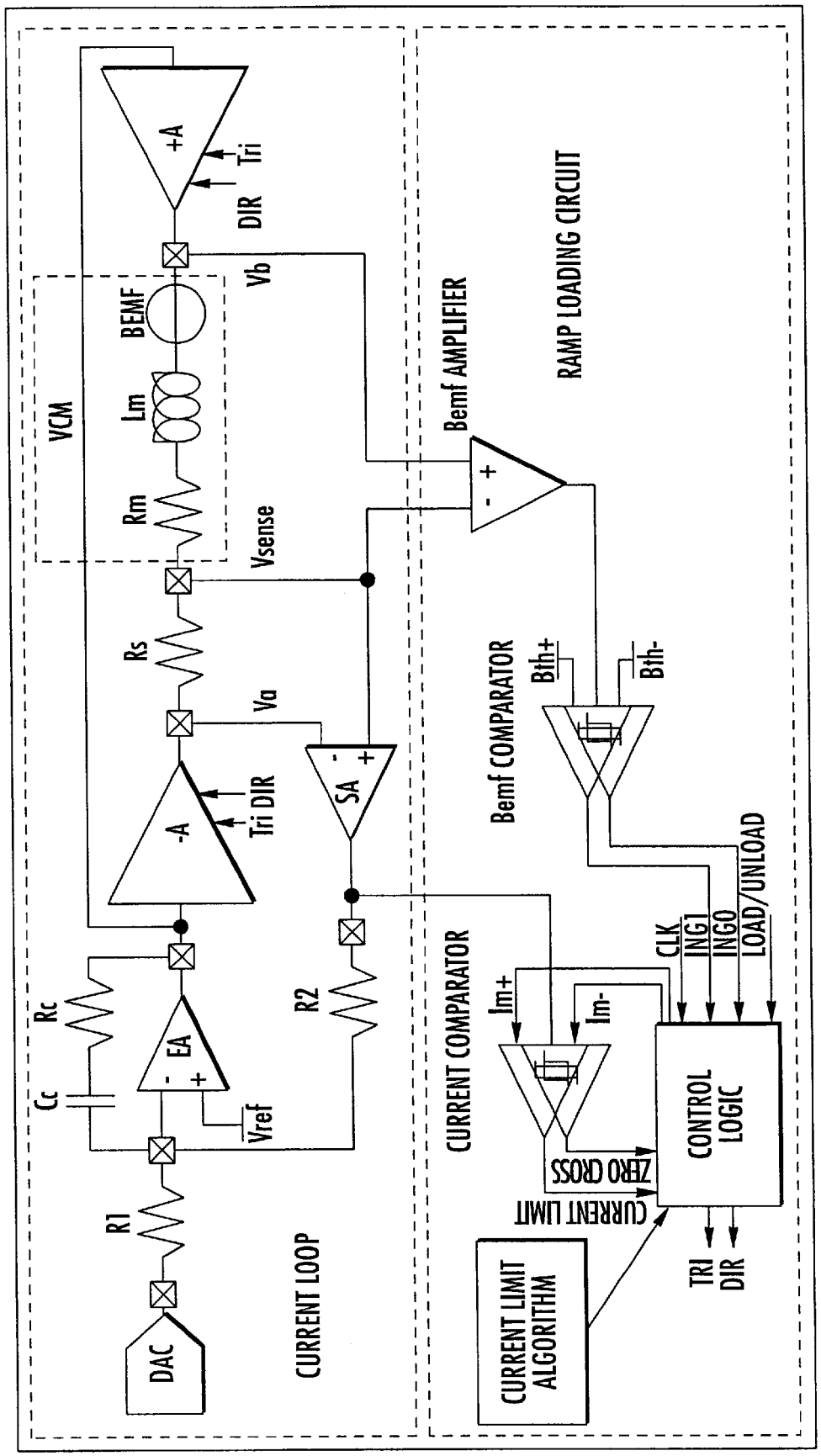
FIG. 1 is a circuit diagram of a VCM controlled driving system according to a first embodiment of the present invention.

FIG. 1 illustrates a hardware embodiment of the present invention. A typical circuit for driving and controlling a VCM using two half-bridge output stages −A and A, which are driven by an error amplifier EA coupled to the output of a digital/analog converter DAC, is depicted in the top portion of the diagram. The top portion is contoured by the dash-line perimeter.

The current mode control loop is formed by monitoring the driving current on a sensing resistor Rs in series to the winding of the motor VCM. The voltage drop on the sensing resistor Rs is amplified by the sensing amplifier SA. An output of the sensing amplifier SA is coupled by the resistance R2 to the inverting input of an error amplifier EA. A reference voltage $V_{REF}$ is applied to the non-inverting input of the error amplifier EA. Components Cc and Rc form a compensation network for the error amplifier EA.

The components that implement the control method of the invention during unloading and loading operations are contoured by the dash-line perimeter in the bottom part of FIG. 1. The amplifier BEMF_Amplifier reads the voltage induced on the winding of the motor in the interval between successive current pulses.

The comparator BEMF_Comparator compares the signal output by the amplifier BEMF_Amplifier with a lower threshold $B_{TH-}$ and an upper threshold $B_{TH+}$ defining the speed regulation window of the arm carrying the head. The result of the comparison is fed to the respective inputs of the control logic block Control_Logic, which is input also with a timing signal $C_{LK}$ and with the unloading or loading command Load/Unload of the arm. This command is eventually generated by an external controller.

The logic control block Control Logic outputs two logic signals DIR and $T_{RI}$ that are applied to the power stage −A and +A. The first one (DIR) establishes the direction of rotation for the successive current pulse to be delivered to the motor. The second one ($T_{RI}$) commands the end of the driving pulse by placing in a high impedance state the output nodes of the two half-bridge output stages −A and +A. To avoid possible conflicts the command TRI has priority over the command DIR.

The above noted components may already be contemplated in the system for driving and controlling the motor or be specifically added, according to the circuit diagram of FIG. 1, for implementing the method of the invention. A fundamental component is the current comparator Current_Comparator for comparing the driving current forced trough the winding of the motor during a driving pulse with a positive threshold $I_{M+}$ or with a negative threshold $I_{M-}$ depending on the direction of rotation commanded by the current pulse. That is, by the direction of the current detected by the sensing amplifier SA. A logic signal is provided representing the result of this comparison. The control logic circuit Control_Logic terminates the driving phase by issuing the command $T_{RI}$.

Figure 2:
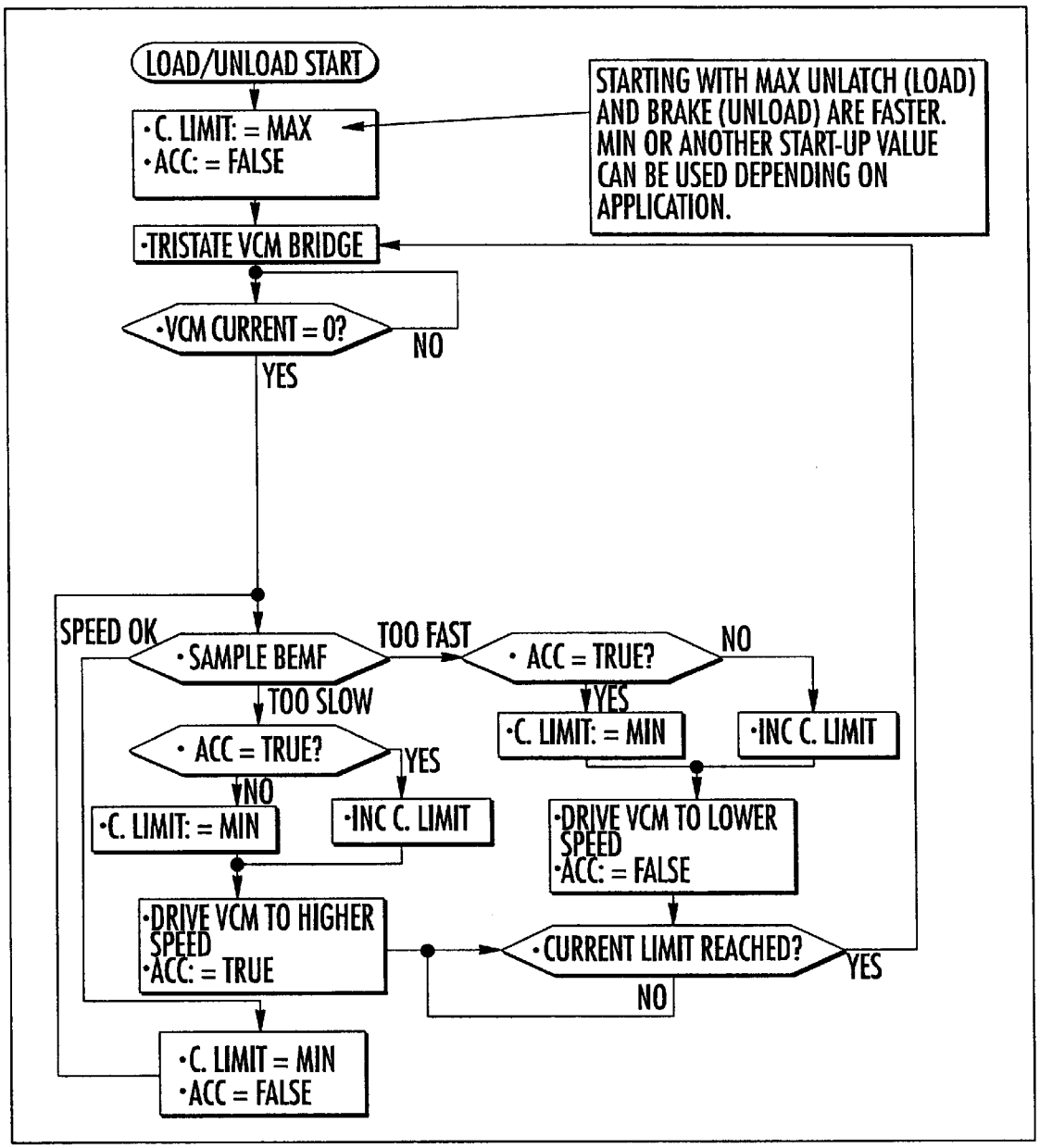
FIG. 2 is a flow-chart of an algorithm according to the present invention.

Essentially, the control circuit Control_Logic adaptively modifies the value of the thresholds $I_{M+}$ and $I_{M-}$ according to the algorithm of the invention. The algorithm is summarized in a flow-chart form in FIG. 2. The flow-chart depicted in FIG. 2 can be easily read with respect to the following description, and by referring to the diagrams of FIG. 3 that graphically illustrate the way in which the control of the present invention is carried out.

The window comparator BEMF_Comparator generates the speed information and provides it to the control circuitry. The control circuitry drives, if necessary, the VCM motor in the desired direction depending on the result of the comparison carried out by the comparator.

The amplitude of the torque generating current pulses delivered to the motor is controlled by the Current_Comparator that switches when the current flowing in the motor reaches a certain limit. The current comparator Current_Comparator provides the result of the comparison to the control logic circuit Control_Logic. The control logic circuit intervenes when the microprocessor commands an unloading or a loading of the head, for example, at the turn-off and at the turn-on of the PC.

The stop condition of the arm in its parking position can be asserted in a conventional manner during the turn-on by an external control or in other operating conditions when the arm is stopped in the parking position at the end of the ramp upon completing the unload operation. The algorithm of the invention for adaptively modifying the current limit modifies the flow in the way indicated in FIG. 2.

A first step of the procedure is establishing the adaptive variation interval of the threshold that limits the current by defining a certain minimum value (MIN), a certain maximum value (MAX), and a certain number n of steps not necessarily identical to each other so that MIN≦CLimit≦MAX.

Moreover a default value for the current threshold is set. The choice of the default value, between MIN and MAX, depends on the operation required by the algorithm (Load or Unload). A possible approach is that of setting such a value equal to MAX for both load and for unload operations, as in FIG. 2. This choice makes the releasing of the arm by the mechanic stop faster when starting a load operation by forcing the VCM to produce a relatively large torque. It also makes more effective the braking during unload operations.

The acceleration variable ACC is initially set false ACC=FALSE. The current value of ACC is registered as ACTUAL so that, at the successive timing cycle, ACC=ACTUAL signifies that the system has detected two successive braking or accelerating pulses. In this case, the value CLimit is automatically incremented to a higher level within the range defined by the limits MIN and MAX.

On the contrary, if ACC differs from the previously stored value ACC#ACTUAL2, the CLimit is immediately set on the minimum value MIN. As an alternative to the above described method, the value of CLimit may be optionally decremented to a lower level, instead of switching it abruptly to the minimum value every time the condition ACC#ACTUAL2 is detected.

This alternative embodiment of the algorithm is useful when the ramp on which the arm lands offers a relatively strong opposing force, i.e., due to friction. In this case, an abrupt torque decrement could unduly stop the arm. To implement such a modification it is sufficient to substitute the assertion CLimit=MIN after the question ACC=TRUE? in the flow-chart of FIG. 2 with the assertion DEC CLimit.

As long as the detected value of the BEMF is between the comparison window, the variable ACC assumes the value FALSE. Therefore, while the rotating speed of the motor remains within the pre-established window, the detected value of the BEMF can vary according to changing frictional conditions. This is an event that could provoke the command of undue consecutive acceleration pulses though the speed is actually close to the pre-established window.

By setting ACC=FALSE when the BEMF is within the comparison window, an undue increment of the limit value CLimit of the driving current is presented. The speed of the arm carrying the head is controlled even during its descent from the ramp, i.e., loading. In this case the system can be in three possible situations.

A first situation is when the speed, which is initially regulated (ACC=FALSE), increases because of the descent from the ramp during the loading operation. When the system reveals that the speed is out of the regulation window, i.e., the upper threshold has been exceeded, the system corrects the speed changing the driving direction of the output bridge stage after having increased the value CLimit of one step. This can be easily recognized in the flow chart in FIG. 2.

A second situation is when the speed, initially lower than the target speed (ACC=TRUE), is increased by the acceleration due to the driving system besides the effect of the descent from the ramp. In this case, if at the successive detection of the BEMF the speed is within the window, the routine starts step 1. Otherwise, if the BEMF has exceeded the upper threshold, the system inverts the driving direction as can be observed in the flow-chart of FIG. 2. A third situation is when the speed is initially greater than the target speed and, therefore, the system is braking.

Figure 3:
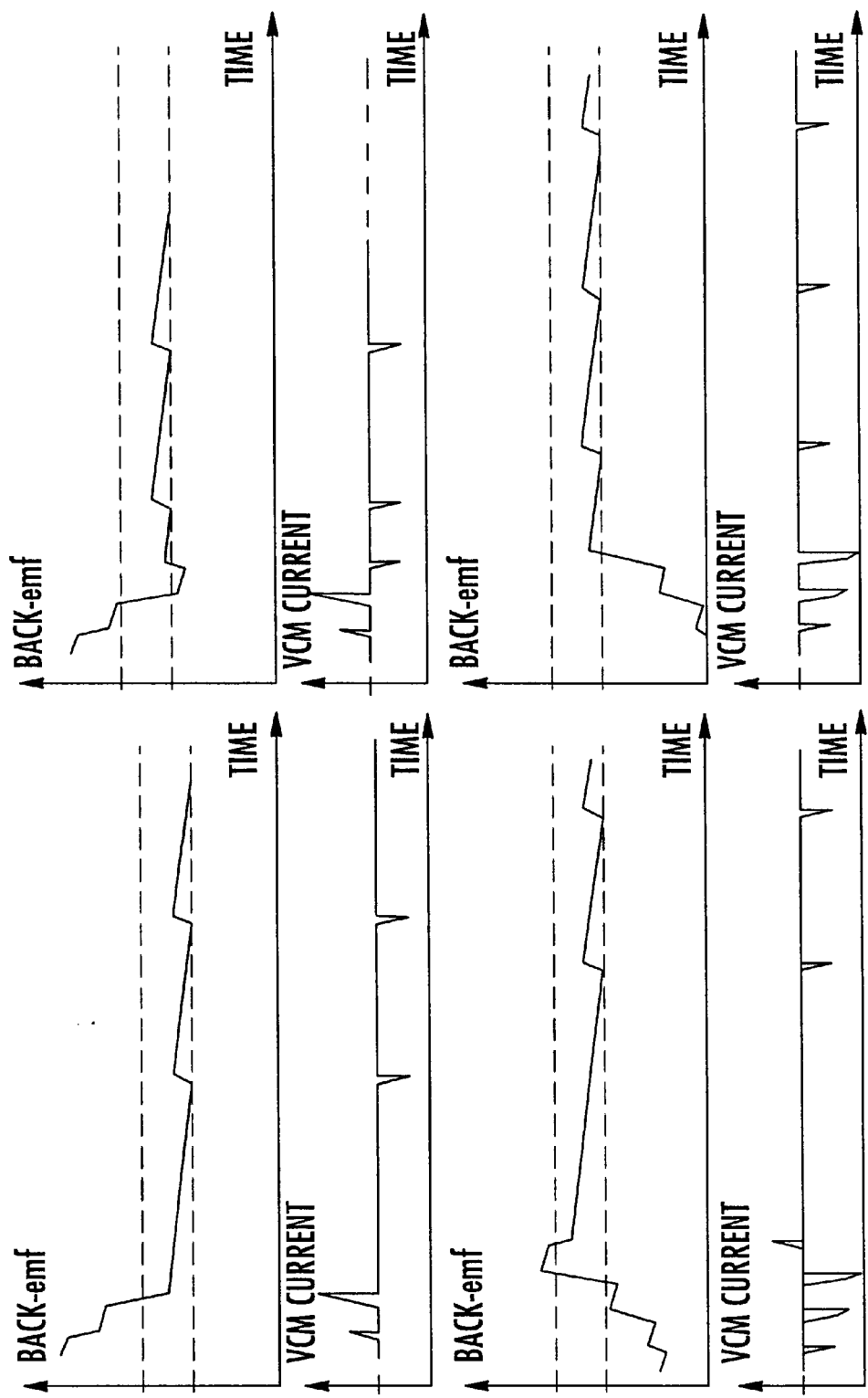
FIG. 3 depicts several different control modes by way of two series of diagrams for the adaptive control system according to the present invention.

Considering that the driving energy fed to the VCM is proportional to the amount of electrical charge, i.e., to the area addressed by each driving pulse, the diagrams of FIG. 3 depict schematically four different operating conditions as they are established by monitoring the speed, i.e., the BEMF. This is in consideration of the design window represented by the pair of parallel dash lines.

The driving pulses equivalent to mechanical torque impulses that are applied to the motor in the form of current pulses VCM CURRENT of incrementally different amplitude are schematically depicted in the relative diagram immediately below the diagram of the profile of the BEMF. At each inversion of the direction of the current pulse fed to the motor, the pulse amplitude is reduced to the pre-established minimum value while the amplitude of the pulses subsequent to a first pulse of the same sign is incrementally increased. This inputs incrementally augmented amounts of electrical charge, i.e., energy, mechanical torque.

If after each pulse provided to the motor a BEMF is detected in an unchanged relationship with the lower and upper thresholds defining the design window, the amplitude of the successive current pulse is incremented. This implements an adaptive variation of the current limit value. The adaptive control of the amplitude (current limit) of the driving pulses fed to the motor makes the system perfectly able to autoadapt to changing mechanical load conditions (friction). These conditions take place during head unload and load commands toward and away from a parking ramp engaged by the head carrying arm moved by the VCM.

According to a further aspect of the invention, it is possible to control the reaching by the arm carrying the head of an eventual mechanical stop and retainment position of the parked arm at the top end of the ramp. In this application, the assertion of the completion of the unload or of the load command, established after a certain time interval of null speed detection, as conventionally done in known systems, may provide false detections during a load operation as well as during an unload operation.

Moreover, systems based on establishing a certain pre-established time interval before asserting the completion of the unload commands cause mechanical stresses because of repeated rebounds of the arm against the mechanic stop and the consequent acoustic noise. This is in addition to intrinsic inefficiency effects.

According to a different embodiment of the present invention, even the unload and load operations of the arm carrying the head can be advantageously optimized by periodically detecting the BEMF as a measure of the speed of the arm and resetting a counter at each non-null detection of the BEMF. The counter is incremented at every detection of a null value of the BEMF successive to a non-null detection. When a certain pre-established value is reached by the counter, the driving of the VCM is stopped.

Such a monitoring positively recognizes if the arm has come to a stop at the end of the parking ramp if the acceleration remains at a null value. This allows an immediate stop of the driving to avoid rebounds and the associated mechanical stresses and acoustic noise. This optimizes efficiency of the drive system.

Figure 4:
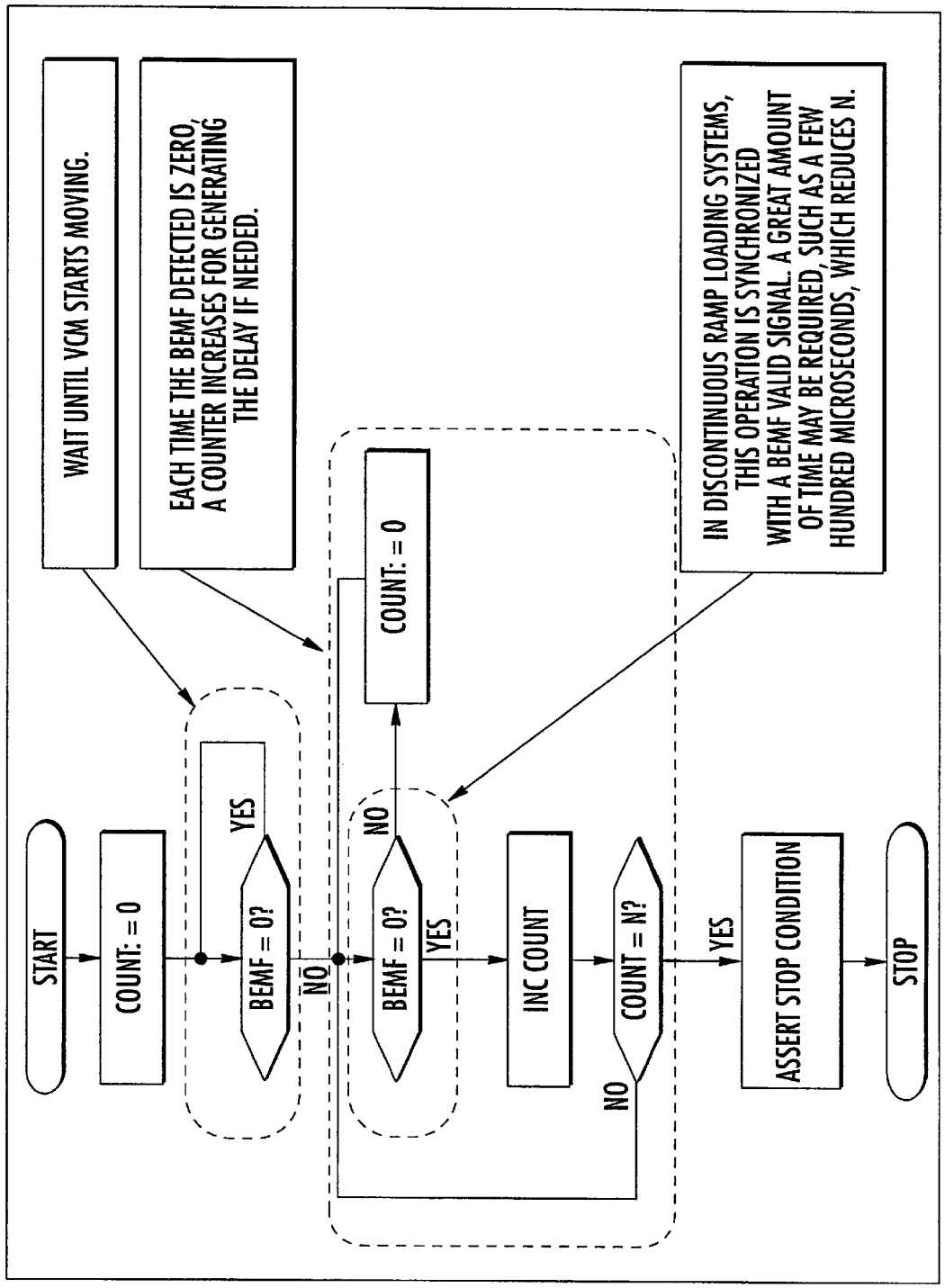
FIG. 4 is a flow-chart of an optimization algorithm for the phase in which the driven arm hits against a mechanical stop according to the present invention.
Figure 5:
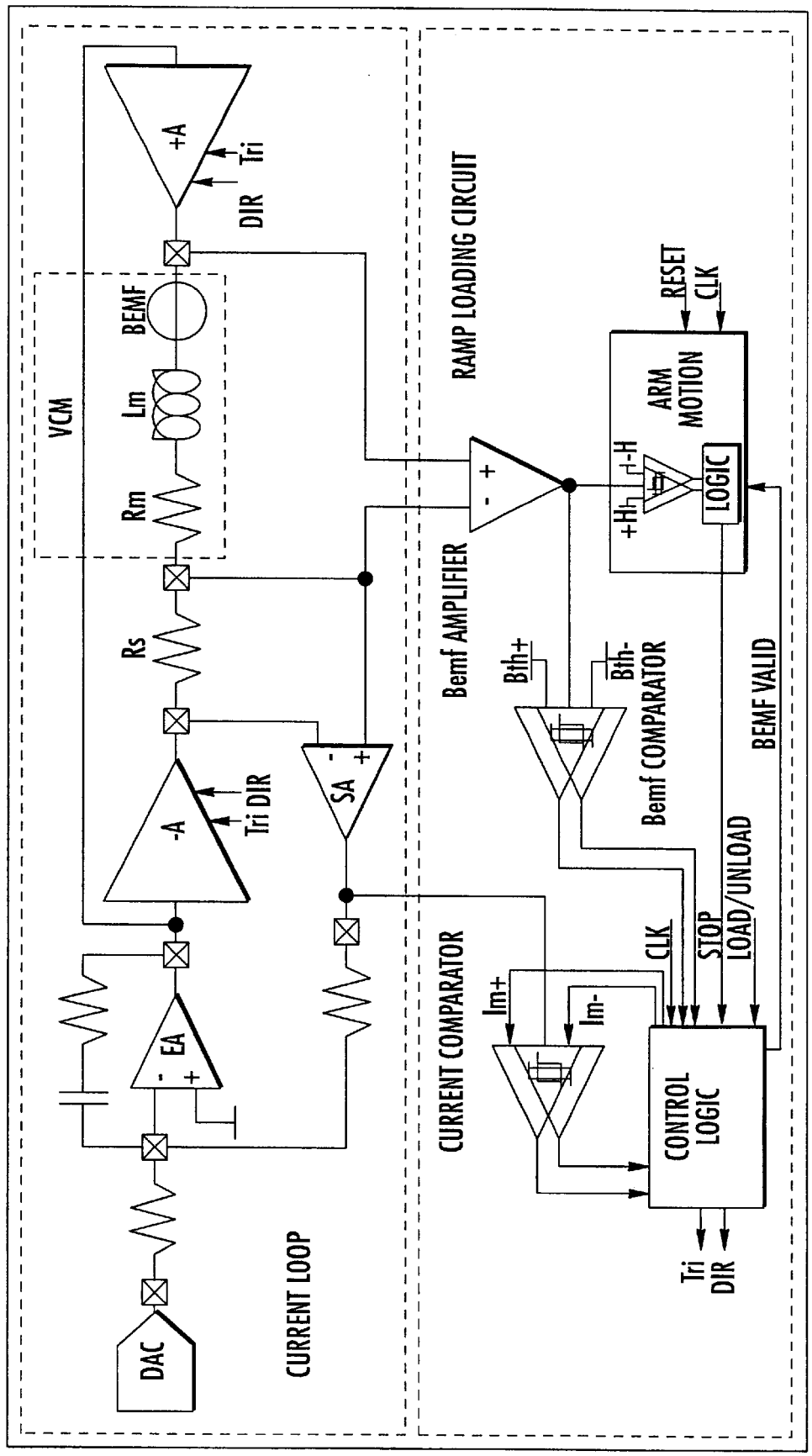
FIG. 5 is a circuit diagram of a VCM driving system including a circuit for controlling stopping of the arm according to the present invention.

The algorithm of this optional application is illustrated in the flow-chart of FIG. 4, while a hardware embodiment, including also this further (optional) control of the stopping phase, is depicted in FIG. 5. The block implementing the control algorithm of the stopping of the arm carrying the head in the rest position at the end of the ramp includes the block Arm_Motion. This block may include a hysteresis comparator for the BEMF, and a logic circuit implementing the above-described control algorithm. In presence of an enabling signal BEMF_Valid provided to the block Arm_Motion by the control logic circuit Control_Logic, the logic circuit generates a STOP command interrupting the driving when the arm has come to a stop.

That which is claimed is:

1. A method for controlling an electromagnetic actuator moving an arm connected thereto using a circuit that temporarily places in a high impedance state output nodes connected to a winding of the electromagnetic actuator, the method comprising:
   comparing a detected back electromotive force (BEMF) of the electromagnetic actuator with a lower threshold and an upper threshold;
   delivering a current pulse to the electromagnetic actuator based upon the comparison of the detected BEMF with the lower and upper thresholds, the current pulse having a first amplitude and polarity if the detected BEMF is less than the lower threshold and an opposite polarity if the detected BEMF is greater than the upper threshold; and
   progressively increasing respective amplitudes of successively delivered current pulses having a same polarity, and decreasing an amplitude of a delivered current pulse having a polarity opposite a polarity of a preceding current pulse.

2. A method according to claim 1, wherein decreasing the amplitude of the delivered current pulse comprises decreasing the amplitude to an established minimum amplitude.

3. A method according to claim 2, further comprising monitoring a current in the winding of the electromagnetic actuator; and wherein increasing the respective amplitudes of successively delivered current pulses comprises comparing the monitored current with a maximum threshold value that is adaptively incremented starting from the established minimum amplitude when the detected BEMF remains unchanged after each delivered current pulse with respect to the lower and upper thresholds.

4. A method according to claim 1, further comprising detecting the BEMF of the electromagnetic actuator by monitoring a voltage induced on the winding thereof between successive current pulses.

5. A method according to claim 1, wherein the electromagnetic actuator comprises a voice coil motor.

6. A method for controlling an electromagnetic actuator moving an arm connected thereto, the method comprising:
   detecting a back electromotive force (BEMF) of the electromagnetic actuator by monitoring a voltage induced on a winding thereof between successive current pulses;
   comparing a detected BEMF of the electromagnetic actuator with a lower threshold and an upper threshold;
   delivering a current pulse to the electromagnetic actuator based upon the comparison of the detected BEMF with the lower and upper thresholds; and
   progressively increasing respective amplitudes of successively delivered current pulses having a same polarity, and decreasing an amplitude of a delivered current pulse having a polarity opposite a polarity of a preceding current pulse.

7. A method according to claim 6, wherein delivering the current pulse comprises delivering a current pulse having a first amplitude and polarity if the detected BEMF is less than the lower threshold, and an opposite polarity if the detected BEMF is greater than the upper threshold.

8. A method according to claim 6, wherein decreasing the amplitude of the delivered current pulse comprises decreasing the amplitude to an established minimum amplitude.

9. A method according to claim 8, further comprising monitoring a current in the winding of the electromagnetic actuator; and wherein increasing the respective amplitudes of successively delivered current pulses comprises comparing the monitored current with a maximum threshold value that is adaptively incremented starting from the established minimum amplitude when the detected BEMF remains unchanged after each delivered current pulse with respect to the lower and upper thresholds.

10. A method according to claim 6, wherein the electromagnetic actuator comprises a voice coil motor.

11. A method for controlling an electromagnetic actuator moving an arm connected thereto, the method comprising:
   comparing a detected back electromotive force (BEMF) of the electromagnetic actuator with a lower threshold and an upper threshold;
   delivering current pulses to the electromagnetic actuator based upon the comparison of the detected BEMF with the lower and upper thresholds; and
   interrupting delivery of the driving current pulses as long as the detected BEMF does not exceed a window defined by the lower and upper thresholds during a time interval.

12. A method according to claim 11, wherein the detected BEMF corresponds to a speed of the arm, the method further comprising:
   resetting a counter at each detection of a non-null value of the detected BEMF; and
   incrementing the counter when a null value of the detected BEMF is detected subsequent to detection of the non-null value.

13. A method according to claim 12, further comprising stopping delivery of the current pulses to the electromagnetic actuator when the counter reaches a certain value.

14. A method according to claim 11, further comprising detecting the BEMF of the electromagnetic actuator by monitoring a voltage induced on a winding thereof between successive current pulses.

15. A method according to claim 11, wherein the electromagnetic actuator comprises a voice coil motor.

16. A device for controlling an electromagnetic actuator having an arm connected thereto, the device comprising:
   a back electromotive force (BEMF) circuit connected to the electromagnetic actuator for comparing a detected BEMF with a lower threshold and an upper threshold; and
   a control circuit connected to said BEMF circuit for delivering current pulses to the electromagnetic actuator based upon the comparison of the detected BEMF with the lower and upper thresholds, said control circuit progressively increasing respective amplitudes of successively delivered current pulses having a same polarity, and decreasing an amplitude of a delivered current pulse having a polarity opposite a polarity of a preceding current pulse.

17. A device according to claim 16, wherein the delivered current pulses have a first amplitude and polarity if the detected BEMF is less than the lower threshold and an opposite polarity if the detected BEMF is greater than the upper threshold.

18. A device according to claim 16, wherein said control circuit decreases the amplitude of the delivered current pulse to an established minimum amplitude.

19. A device according to claim 18, further comprising a current loop for monitoring a current in a winding of the electromagnetic actuator; and wherein said control circuit, for increasing the respective amplitudes of successively delivered current pulses, compares the monitored current with a maximum threshold value that is adaptively incremented starting from the established minimum amplitude when the detected BEMF remains unchanged after each delivered current pulse with respect to the lower and upper thresholds.

20. A device according to claim 19, wherein said current loop monitors the current between successive delivered current pulses.

21. A device according to claim 16, wherein the electromagnetic actuator comprises a voice coil motor.

22. A device for controlling an electromagnetic actuator having an arm connected thereto, the device comprising:
- a back electromotive force (BEMF) circuit connected to the electromagnetic actuator for comparing a detected BEMF with a lower threshold and an upper threshold; and
- a control circuit for delivering current pulses to the electromagnetic actuator based upon the comparison of the detected BEMF with the lower and upper thresholds, and interrupting delivery of the current pulses as long as the detected BEMF does not exit a window defined by the lower and upper thresholds during a time interval.

23. A device according to claim 22, wherein the detected BEMF corresponds a speed of the arm, the device further comprising a counter being reset at each detection of a non-null value of the detected BEMF, and being incremented when a null value of the detected BEMF is detected subsequent to detection of the non-null value.

24. A device according to claim 23, wherein said control circuit stops delivery of the current pulses to the electromagnetic actuator when said counter reaches a certain value.

25. A device according to claim 22, wherein the electromagnetic actuator comprises a voice coil motor.

* * * * *